Feb. 6, 1951 C. M. BROWN ET AL 2,540,094
PEANUT HARVESTER
Filed Jan. 8, 1945 6 Sheets-Sheet 1

Inventors
Charlie M. Brown,
Floyd Horne,
By
Attorneys

Patented Feb. 6, 1951

2,540,094

UNITED STATES PATENT OFFICE 2,540,094

PEANUT HARVESTER

Charlie M. Brown, Ackerly, Tex., and Floyd Horne, Portales, N. Mex.

Application January 8, 1945, Serial No. 571,810

9 Claims. (Cl. 55—108)

This invention relates to harvesters and more particularly to a machine for harvesting peanuts and the like.

Machines have been previously invented for harvesting peanuts, which machines have operated successfully in some respects but not with the fully desirable commercial effect and capacity. All peanuts harvesting machines of which we are aware have some serious disadvantage in the construction, arrangement and operation thereof.

There are several different kinds and sizes of peanuts and no machine of which we are aware is capable of harvesting peanuts of every kind. Some may harvest the larger peanuts quite successfully and some peanuts of different kinds while other machines are more or less practical for the harvesting of the smaller peanuts and of other kind, but no machine of which we are aware is capable of harvesting peanuts of all kinds and sizes successfully.

One object of the present invention is to produce a machine which will harvest successfully all kinds and sizes of peanuts.

Another object is to produce a machine which is readily attachable to a conventional farm tractor to be propelled, controlled and operated therefrom.

A further object is to improve generally upon machines of this character and to simplify and make more practical and efficient certain operating parts of the same.

A still further object is to provide an improved leading digger means in combination with a following conveyor and soil removing means, with simplified control and adjustment, for conveying the vines as dug from the ground and at the same time freeing the same of dirt.

Yet another object is to provide a simplified and improved receiving and dumping means for the harvested vines under the control of a single operator who also has control of the several other operating parts of the machine.

Other important objects to be attained will hereinafter more fully appear from the following description.

The invention consists in the novel general construction and arrangement of parts, a practical exemplification of which is illustrated in the accompanying drawings, in which.

Figure 1:
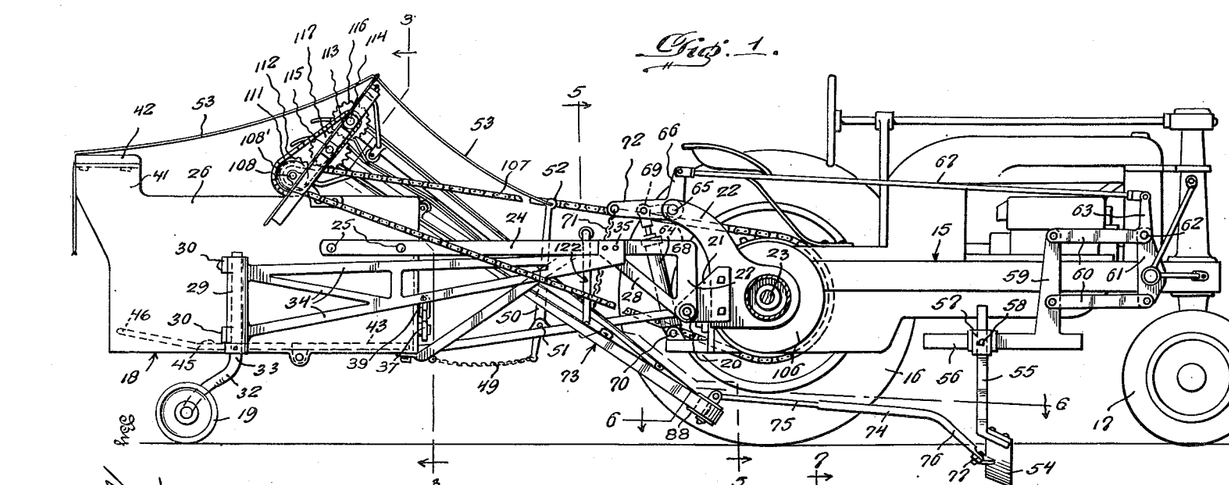
Figure 1 is a side elevation illustrating a harvesting machine constructed according to the invention and attached to a conventional farm tractor.
Figure 2:
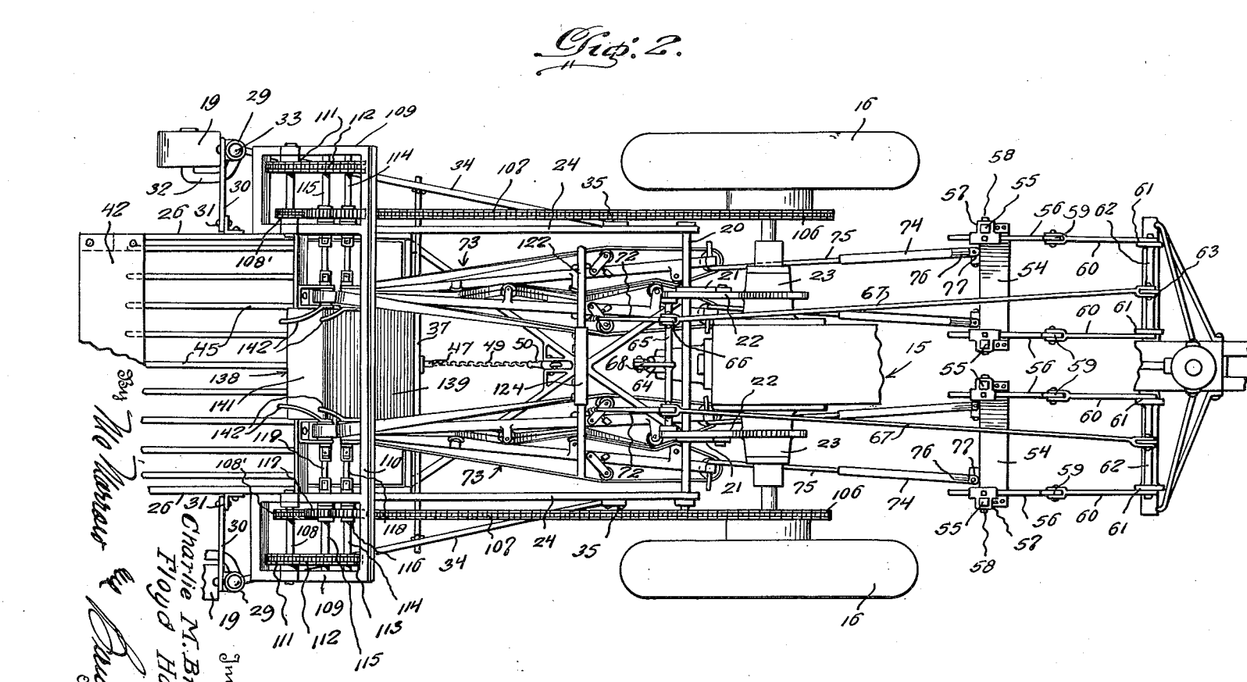
Figure 2 is a general top plan view.
Figure 5:
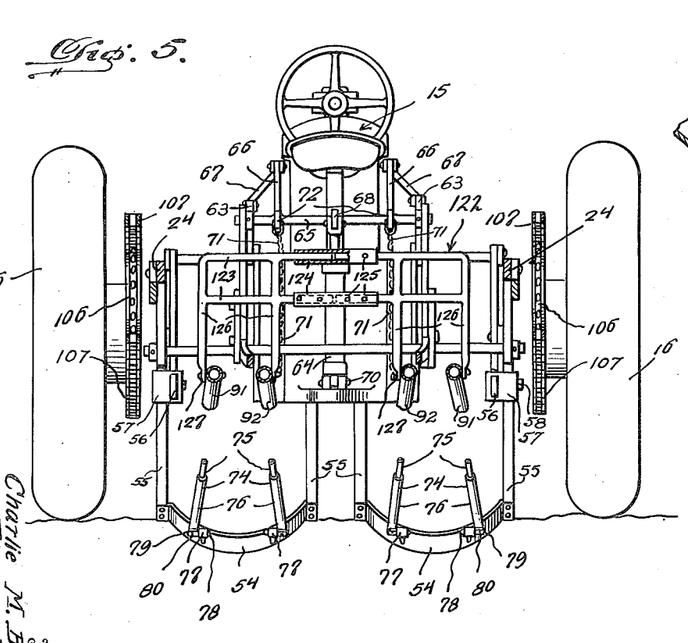
Figure 5 is a transverse section taken on or about the line 5—5 of Figure 1.

Referring now to the drawings in detail, numeral 15 designates, generally, a conventional farm tractor (see Figures 1, 2 and 5). As shown, the tractor is provided with the pair of usually large ground wheels 16 at the rear thereof and the smaller steering wheel or wheels 17 at its front end. In all respects, as far as the tractor itself is concerned, the same may be of any approved or desirable construction and arrangement.

As to the harvesting machine of the present invention, which includes a receiving and dumping means generally designated by the reference numeral 18, it may be here first generally stated that a forward main portion of the harvesting machine is, for practical purposes, attached to the rear end of the tractor hingedly with up and down movement but without any lateral movement or appreciable swing with relation to the tractor, and that the rear portion of the harvesting machine is provided with outriggers or lateral and vertically swingable extensions which are supported on caster-like ground wheels now designated by the reference numeral 19 and the pivotal connection between the harvesting machine and the tractor being designated generally by the reference numeral 20.

As shown more clearly in Figure 2, the pivotal connection 20 comprises a transverse shaft which is somewhat longer than the width of the tractor frame and extends through apertured rigid brackets 21 which are secured to companion brackets 22 of an elongated form, which latter are rigidly secured to the rear of the tractor and preferably to the rear axle housing 23 thereof. Said rod 20 is held against endwise movement by any suitable means, obviously collars or other suitable stop elements secured thereon and abutting the respective brackets 21. In this connection, it is here noted that the rod 20, while held against endwise movement, is either rotatable in or held against rotation therein in said brackets 21.

Pivotally mounted on the shaft 20, if the same be non-rotatable in the brackets 21, or rigidly attached to said shaft 20 if the same be rotatable in said brackets 21, are the forward end portions of horizontal rods or bars 24, which latter are rigidly secured, as at 25, as by screws, bolts or the like, or other suitable means to the opposite side walls 26 of the receiving and dumping means 18. Then, inasmuch as the bars 24 are in a plane above the shaft 20, the forward end portions 27 of said rods or bars 24 are turned downwardly substantially at a right angle, as shown more clearly in Figure 1, where the bars or rods 24 join said shaft 20, and these end portions 27 are preferably rigidly connected to the bars or rods 24 by diagonal brace members 28. By this construction and arrangement, the collecting and dumping means 18 is movable up and down but is held against lateral movement, either directly transversely or turnably, relative to the tractor and it is for this up and down movement only that the caster or like ground wheels 19 are provided. In this connection, as first above noted, these ground wheels 19 are carried by outrigger or supporting members 29 which as shown (see Figures 1, 2 and 3) comprise each a vertical tubular member, said member 29 being connected pivotally to the adjacent side wall of the collecting and dumping unit by parallel links 30, as at 31 (see Figures 2 and 3). The wheels 19 are held on the lower ends of offset portions 32 of vertical spindle members 33 which are fitted and secured rotatably in the outrigger members 29. Thus, as the body of the unit 18 moves up and down the pivotally connected ground wheels 19 remain on the ground and also the ground wheels have up and down movement independently of said body of the unit 18 to compensate for any unevenness in the ground over which the wheels 19 travel.

The outrigger members 29 are rigidly attached to or formed integrally with forwardly extending frames 34, which frames are preferably open and tapered substantially as shown, the forward ends of said frames being attached, as at 35, to said bars or rods 24 which connect the harvesting machine to the tractor.

Pivoted, centrally, as at 36, to the front lower end portion of the body 18 of the collector and dumping unit, is a transverse bar 37 of a length so that its ends extend beyond the sides of the body 18 and terminate under the frames 34. Where the ends of the bar 37 project under said frames 34, said frames are provided with inwardly projecting hooks 38 to which the adjacent ends of the bar 37 are connected by a flexible element or chain 39. By this provision, the lower forward end portion of the body 18 is supported substantially universally so that said body is always maintained in a substantially horizontal position yet the bar 37 is tiltable and permits the frames 34 to move upwardly and downwardly from their attachment 35 on the bars or rods 24 as the wheels 19 move up and down on uneven ground.

Figure 3:
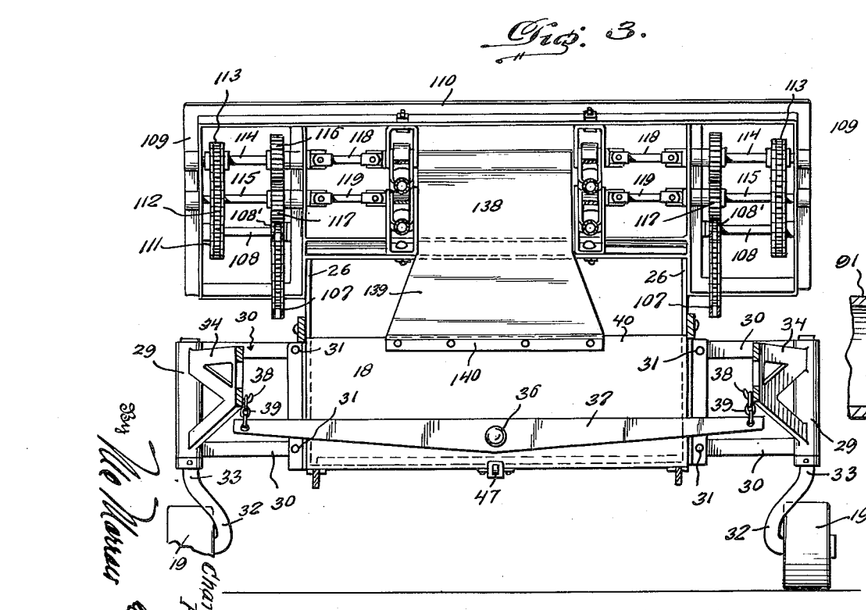
Figure 3 is a transverse section taken on or about the line 3—3 of Figure 1.
Figure 4:
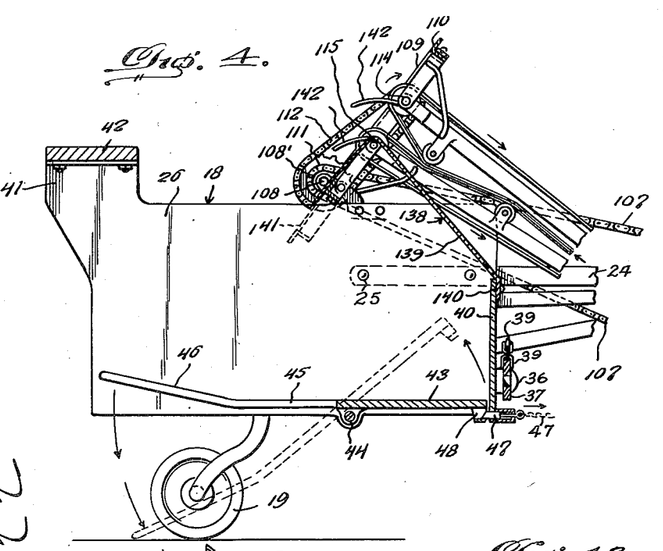
Figure 4 is a fragmentary longitudinal sectional view through the collecting and dumping means and the adjacent conveyor parts.

The body 18 of the collector and dumping unit may be of any desirable form. But, it is preferably of generally rectangular form and includes the opposite side walls 26 previously described. At the front end of the body 18 is provided an end wall 40 which, as shown in Figures 3 and 4, is not as high as the side walls 26. In some structures, however, this end wall may extend substantially to the height of the side walls 26. The rear end of the body 18 is without any rear wall or closure member. Mounted on the rearwardly offset and upwardly extending portions 41 of the side walls 26 is a transverse seat member 42 connecting said side walls 26. This seat portion, as will be later more fully described, is for the accommodation of an operator who controls manually the filling of the collector and dumping unit 18 and also the operation of the several parts of the mechanism which supply the harvested vines to said unit 18.

The body 18 has a dumping bottom, which, as shown in Figure 4, has a solid or closed forward plate portion 43 pivotally mounted, as at 44, to swing about a horizontal axis transversely of the body 18. Extending rearwardly from the rear edge of the solid closed plate portion 43 is a plurality of tines or forks 45, a portion of which is substantially horizontal with the plate member 43; the rear portions of said tines or forks being inclined slightly upward, as at 46, the purpose of which is to keep the received vines on said tines or forks until the time of dumping the accumulation thereon. So, too, the pivotal axis 44 is located somewhat forward of the center of the dumping bottom, so that, when loaded, the bottom of the unit 18 is self-dumping unless held from such actuation.

To releasably hold the dumping bottom of the unit 18 in normally closed position, a spring influenced latch element 47 is provided on the lower front part of the body 18 to normally engage a conventional keeper 48 on the forward end of the dumping bottom member 43. This latch member 47 is connected by a chain 49 to the lower end of a rocking lever 50 suitably mounted pivotally on the frame of the machine, as at 51, and having its upper end portion 52 connected to a pull cord 53 which is carried to within convenient reach of the operator on the seat 42. By this provision, latch element 47 is normally closed and all that the operator has to do to dump the unit 18 is to pull the cord 53, whereby the loaded bottom is automatically dumped, after which all the operator has to do in closing the bottom is to push the forward portion of the same with his foot to effect engagement of the dumping bottom with said latch element 47.

The digger means for the machine will now be described in detail. This digger means of the present invention is an important and essential feature in itself and in connection with the means to be later described for conveying the harvested vines to the collecting and dumping unit 18.

As shown more clearly in Figures 1, 2, 5 and 7, there is a parallel pair of these digger elements but as these digger elements are alike in form and function a description of a single element will suffice. As shown, the digger element or unit comprises a curved or substantially arcuate digger and cutter element 54, one of these members 54 being supported on each side of the longitudinal axis of the tractor. Each cutter and digger member 54 is supported with vertical adjustment in any conventional manner on the tractor 15. As shown, the member 54 is provided at its opposite ends with upright bars 55 which have their upper end portions mounted vertically adjustable in horizontal supporting arms 56, as at 57, and releasably secured in their adjusted position by set screws or the like 58. As shown, each horizontal arm 56 is supported near one end by an upright bar 59 which has a parallel horizontal link connection 60 with a vertical bracket 61, that is to say, there are four of these brackets 61 each rigidly attached to the frame of the tractor 15. A companion pair of the upper parallel links 60, at one side of the longitudinal axis of the tractor, is attached to a rock shaft 62 in each companion pair of the brackets 61, rock shaft 62 having an upstanding rocker arm 63 integral or fixed thereon, so that, when the rocker arm 63 is rocked, the companion rock shaft 62 is accordingly rotated and the attached arm 59 lifted or lowered, according to the direction of rotation of the shaft 62 and in turn the vertical arm 59 is lifted or lowered vertically through the parallel relation of the links 60, thereby lifting or lowering the horizontal bars 56 and raising or lowering the cutter and digger members 54.

In operation of the harvesting machine, the cutter and digger members 54 are adjusted for the cutting and digging depth thereof by adjusting the bars or shanks 55 vertically in guides 57 of the horizontal supporting bars 56. In this vertical adjustment of the members 54 these members are connected, in a manner to be presently more fully described, to a vine conveying means which, also, in itself, is adjustable. If it is desired to lift the cutter and digger members out of the ground, when not in use, this may be accomplished either manually or by a suitable power means. As shown, a conventional fluid pressure cylinder 64 is provided, the same receiving its fluid pressure from a conventional source provided on the ordinary farm tractor and not necessarily shown in detail in the present drawings. For this particular purpose, a rock shaft 65 is journaled at its ends in said first herein described bracket members 22 (see Figures 1 and 2). Rock shaft 65 is provided near each end with a rigid rocker arm 66 and each rocker arm 66 is connected by a push and pull rod 67 to the respective aforementioned rocker arms 63. The shaft 65 is provided at or about its middle portion with a rearwardly extending rocker arm 68 (best shown in Figure 2) to which the rod of the piston in the cylinder 64 is pivotally connected, as at 69, and said cylinder being pivotally mounted, as at 70, on the frame of the tractor. Thus, when pressure is supplied to the lower end portion of the cylinder 64 and against the piston therein, through the connection of the several rocker arms, rods and link members, horizontal bars 56 are lifted and accordingly the members 54 are drawn entirely out of the ground.

In operation of the harvester, the depth setting of the digger members 54 being determined, said members 54 are held in their lowered position by the aforesaid adjustable link and leverage connection with the push and pull rod 67 thereabove, but chains 71 are connected at their upper ends to a pair of arms 72 extending rearwardly and rigidly from the rock shaft 65 adjacent to or integral with the rocker arms 66 thereof and the lower ends of these chains 71 are in turn connected to a convenient part of the conveyor means of the machine (to be later described), which means is also thereby held raised from the ground by said chain connection in working correlation to said digger members.

The cutter and digger members 54 have a universally pivoted link connection with the vine conveyor means of the machine now designated generally by the reference numeral 73 and hereinafter described more fully in detail. This connection between the members 54 and the conveyor unit 73 comprises a pair of telescopic longitudinal rods each comprising a tubular section 74 and a rod section 75 sliding in said tubular section. The tubular sections 74 and the rod sections 75 when joined together are at all times substantially horizontal during the operation of the machine, and the forward end portions of the tubular sections 74 are inclined downwardly towards the members 54.

Figure 7:
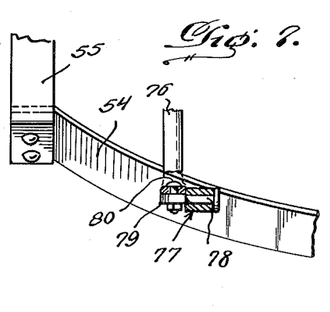
Figure 7 is a fragmentary detail view partly in elevation and partly in section taken on or about the line 7—7 of Figure 6.
Figure 8:
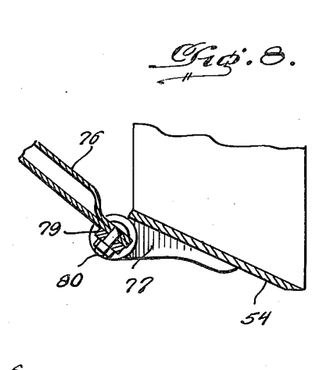
Figure 8 is a sectional view, on an enlarged scale, taken on the line 8—8 of Figure 6.

The downwardly turned end portions 76 of the tubular section 74 are connected to the respective cutter and digger members 54 by universal joints 77, best shown in Figure 7, these joints comprising lugs extending rearwardly from the members 54 and having horizontal bores therein in which are rotatably fitted studs 78 having heads 79, the heads 79 having vertical apertures therein for the reception of pivot pins or the like 80 by which the ends 76 of the sections 74 are connected directly to said heads 79.

Figure 6:
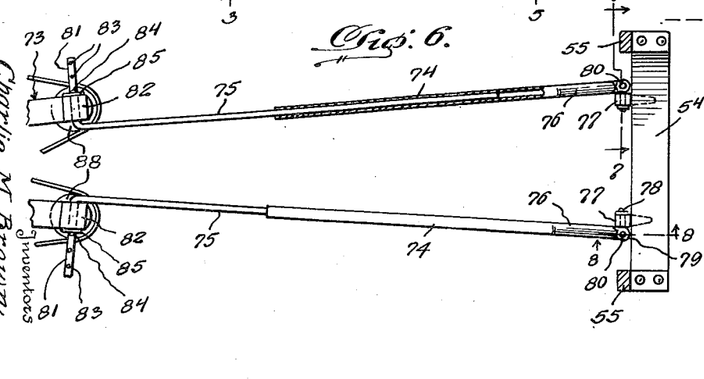
Figure 6 is a horizontal section taken on or about the line 6—6 of Figure 1.

Each pair of digger connector rods 75 have their rear end portions turned outwardly, as at 81, at right angles to the body portion (best shown in Figures 6 and 9) which end portions 81 are hingedly connected, with substantially universal movement, to the forward ends of transversely spaced apart members of the respective vine conveyor units 73 to be described, in themselves, more specifically later on. That is to say, the connection between the rods 75 and the conveyor units 73 permits a combined free up and down as well as lateral movement of said rods 75 and the tubular sections 74 in which said rods 75 are fitted longitudinally slidable therein. For this connection see Figures 6, 9 and 10. It may be here stated that the respective conveyor units 73 each comprises a pair of convergent yet substantially parallel sections 73' and 73'' and it is to these two sections 73' and 73'' to which the rods 75 are directly connected. That is to say, the forward end portion of each section 73' and 73'' is provided with a socket member 82 having a stem portion 83 which is fitted rotatably in a bore provided for the purpose in the respective conveyor sections and on which stems a belt pulley to be later described is journaled. Each socket member 82 is provided with a transverse bore therethrough in which is received and fitted rotatably the angular end portion 81 of the respective rods 75. Each angular end extension of the rods 75 is provided with a series of apertures therethrough for the reception of a retaining pin 84. The forward end portions of the conveyor sections 73' and 73'' are usually spaced and held normally a definite distance apart, and, ordinarily, each companion pair of rods 75 are held close to the inner sides of the forward end portions of said sections 73' and 73'', in which case a collar 85 is slipped on the rod end portion 81 and held against the adjacent outer side of the socket member 82 and held in place by a pin 84 in the next adjacent aperture in said rod end portion 81 (see Figures 6 and 9). Should it be desired to bring the rods 75 inward closer together the single collar 84 is removed from the rod end extension 81, said extension moved inwardly through the socket member 82, and the latter held in place by providing two of said collars 84, one on each side of said socket member 82 and, of course, held in place by a companion pair of the pins 84.

By the foregoing as just above described, for the harvesting of some vines, said inward adjustment of the rods 75 may be made yet at all times the connecting rods 75 and tubular sections 74 are permitted a substantially universal movement to compensate for any unevenness in the ground or the necessarily variable movement of the parts in a harvesting machine of this character.

A detailed description of the vine conveyor unit or rather the pair of said units is now in order. As just above described, each conveyor unit 73 comprises the two sections 73' and 73''. There are a pair of these units, one located on each side of the longitudinal axis of the tractor in line with the companion digger member ahead thereof.

Each conveyor section 73' comprises an endless belt 86 and each section 73'' comprises an endless belt 87. The belt of each section passes over a pulley 88 at the forward end of the section and said pulleys 88 are in the same horizontal plane and spaced a substantial distance apart from each other. The belt 86 travels over a pulley 89 at the rear end of the section 73' while the belt 87 travels over a pulley 90 at the rear end of the section 73'' and in a plane directly or nearly directly vertically below the pulley 89. The pulleys 88 are journaled on the stems 83 of the sockets 82.

The conveyor belts 86 and 87 have their inner runs arranged to travel closely together in substantially parallel though slightly tortuous directions throughout substantially the entire length of each conveyor unit. These companion traveling portions of the two belts 86 and 87 are peculiarly arranged in a varying cooperative angular relation and in the operation of the machine the plants or vines as dug from the ground are guided between the rods 75 and tubular sections 74 whence they are taken in between the flared meeting portions of the belts 86 and 87 (see for clarity Figure 9) and from there on the plants or vines are carried between the contacting inner runs of the belts. As said inner runs of the belts are arranged to vary their angularity from a substantially vertical meeting plane at the forward ends of the conveyor to a substantially horizontal plane at the rear ends of the conveyor the plants or vines carried between the belts are gradually turned from the vertical position in which they are taken from the ground and changed to a substantially horizontal position as they are discharged from the conveyor unit into the receiving and dumping unit 18. In this connection, it is further noted that in the turning of the conveyed plants or vines as above described, the root portions of the vines conveyed by each conveyor unit are turned inwardly and through the intermediary of means to be later described the plants or vines from both of the pair of conveyor units 73 are brought close together with their root ends toward each other at the time the same are discharged into the receiving and dumping unit. The details of this particular means will be also later described.

Now reverting to the description of the conveyor unit 73 it is first pointed out that each unit comprises a pair of elongated beams 91 and 92 which are located in a twisted relation to each other (best shown in Figures 9 and 10) said beams carrying at their forward ends the pulleys 88 and the beam 91 carrying at its opposite end the pulley 89 and the beam 92 carrying at its opposite end the pulley 90. As hereinbefore described in connection with the pulleys 88 and 89, 90, the forward ends of the beams 91 and 92 are in the same horizontal plane while their rear end portions are in substantially the same vertical plane.

The outer runs of the belts 86 and 87 travel over idler pulleys 93. These pulleys are journaled on the outer ends of arms 93' which are pivotally mounted, as at 94, on the respective beams 91 and 92. On each beam there is provided a supporting member 95 which carries a spring urged pin or element 96 which normally presses against the adjacent arm 93' and thus forces the pulley 93 into pressing contact with the outer run of the belt 86 or 87, as the case may be, thereby maintaining a tension on the endless belts 86 and 87, respectively. The inner run of the belt 87 travels first over an idler 97 journaled on an inwardly extending rigid bracket member 97' on the beam 92, while the inner run of the belt 86 first travels over an idler 98 likewise journaled on an arm 98' extending inwardly rigidly from the beam 91. The belt supporting portions of the pulleys 97 and 98 are in different longitudinal planes or, in other words, offset from each other so that the inner runs of the belts 86 and 87 are given a slight tortuous angular turn. From the two pulleys 97 and 98 the two belts travel over the same idler 99 which is journaled at the end of a rigid arm 99' on the beam 92. This pulley 99 is also positioned so as to give a slight reverse tortuous turn to the inner flights of the two cooperatively opposed belts. Rearwardly from the pulley 99 is another pulley 101 journaled on the end of a bracket 100 extending from the beam 91. This pulley 100 also projects from the beam 91 a distance to give a slight tortuous angle to the inner flights of the belts 86 and 87. Also rearwardly from the pulley 100 is still another pulley 102 journaled on a bracket extension 103 of the beam 92, and rearward of the pulley 102 is still another pulley 104 on a bracket 105 projected inwardly from the beam 91. The belt supporting portions of these two pulleys are also staggered so as to give the aforementioned tortuosity to the cooperating inner flights of the two belts 86 and 87. From the pulley 104 the inner flights of the two belts 86 and 87 diverge toward the respective pulleys 89 and 90 whence the outer flights of the two belts 86 and 87 move towards the laterally spaced apart pulleys 88 at the forward ends of the beams 91 and 92.

By the foregoing described arrangement of the two belts 86 and 87 on each conveyor unit 73, the plants or vines as dug by the leading digger members 54 are guided by the substantially parallel pair of rods 75 and tubular members 74 into the converging inner flights of the two belts 86 and 87 whence they are taken between the said inner flights of the belts between the pulleys 97 and 98, from which point the plants or vines travel tortuously as held by the two belt flights, which latter change angularity towards the end of the conveyor unit 73 near which the endmost pulley 104 is positioned so as to place the cooperating portions of the belt flights passing thereover also in a substantially horizontal position so that the plants or vines are there held or rather supported momentarily in a corresponding horizontal position but with their root portions inwardly and the tops thereof outward. In this connection, of course, the belts of each conveyor unit 73 are arranged reversely to those of the other unit so that the two rows of harvested plants or vines have their root portions disposed toward each other as the same are deposited in the collector and dumping unit 18 from said conveyor units 73.

So much for the principle of operation of the conveyor units 73. A practical means for operating said units will now be described.

For the purposes of the present invention, the conveyor units 73 are preferably driven the one independently of the other but both in substantially the same manner and at the same speed. Therefore, a description of the driving means for one of the units 73 will suffice.

As shown, the units 73 are driven from the rear axle of the tractor 15. This is shown more clearly in Figures 1 and 2. For each unit 73 there is secured on the driving axle 23 adjacent the ground wheel 16 at that particular side of the tractor a sprocket gear 106. An endless chain 107 passing around said sprocket gear 106 drives a smaller sprocket gear 108' fixed on a countershaft 108, journaled in a side frame 109 secured on the adjacent side of the receiving and dumping unit 18. For strength and rigidity the side frames 109 which are located one on each side of the unit 18 are cross connected by a rigid transverse bar 110 (see Figures 2 and 3).

The counter-shaft 108 carries a sprocket gear 111 near its outer end and over this sprocket gear 111 passes a chain 112 which drives a sprocket gear 113 fixed on a second counter-shaft 114 journaled in the side bracket 109. On the second counter-shaft 114 is fixed a spur gear 116 which drives a like gear 117 fixed on a third counter-shaft 115. The counter-shafts 114, 115 drive, respectively, the belts 73' and 73" of the conveyor unit 73.

Figure 11:
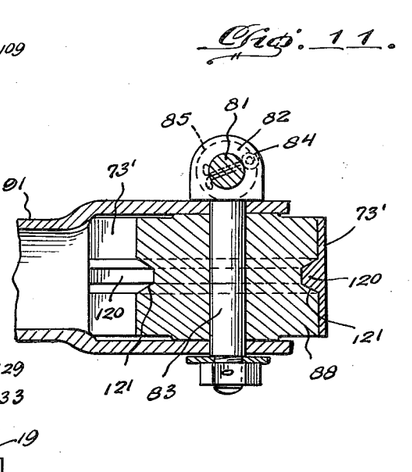
Figure 11 is a detail view, on an enlarged scale, and as a fragmentary section taken on or about the line 11—11 of Figure 9.

The shaft of the pulley 89 of the conveyor belt 73' is driven from the counter-shaft 114 by a link shaft 118 having a universal connection at its ends to the counter-shaft 114 and the shaft of said pulley 89. Likewise, the shaft of the pulley 90 of the companion belt 73" of the conveyor unit is connected to said counter-shaft 115 by a link shaft 119. This driving connection is shown more clearly in Figures 2 and 3. Inasmuch as the aforesaid driving means is duplicated on opposite sides of the machine for the pair of conveyor units 73, the belts of said units are driven simultaneously and at the same speed from the rear axle of the tractor. It is here further noted that the driving belt 73' or 73" may be of any suitable kind or type. As more clearly shown in the enlarged detail in Figure 11, these belts are provided on their inner faces with continuous longitudinal ribs 120 and the respective pulleys over which the belts travel are provided with annular counterpart grooves 121. An example of this is illustrated in Figure 11 in connection with the forward pulley 88 of either the beam 91 or 92.

Figure 9:
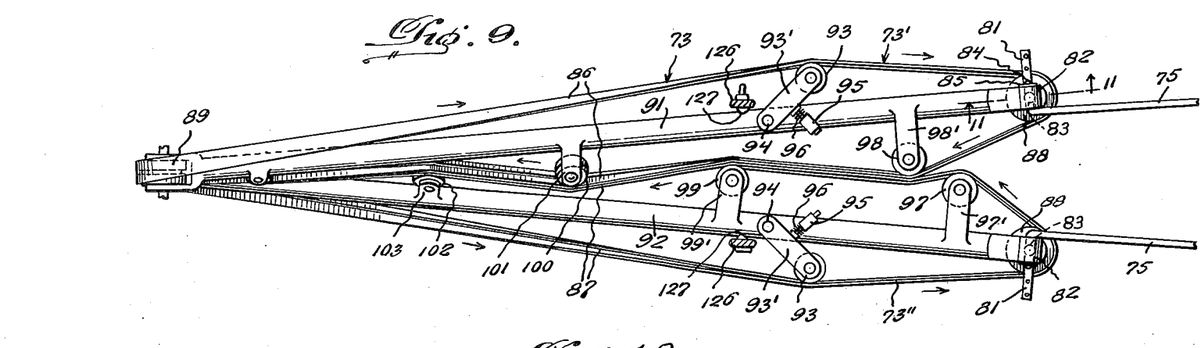
Figure 9 is a plan view, on an enlarged scale, of the vine conveyor mechanism.
Figure 10:
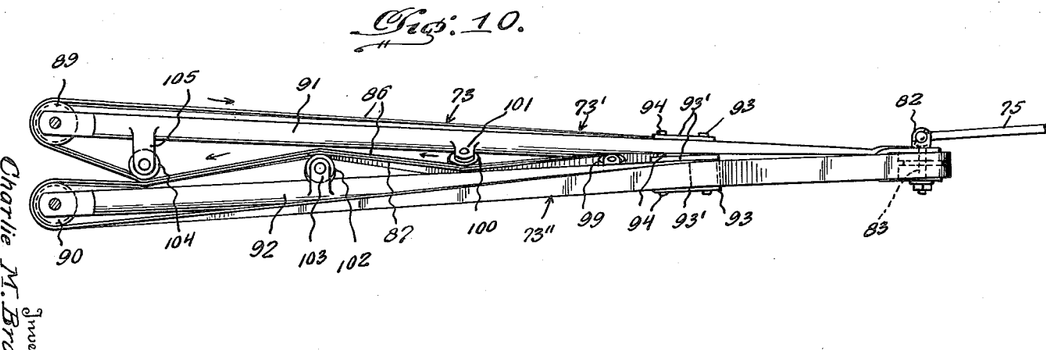
Figure 10 is a side elevation of the parts shown in Figure 9.
Figure 12:
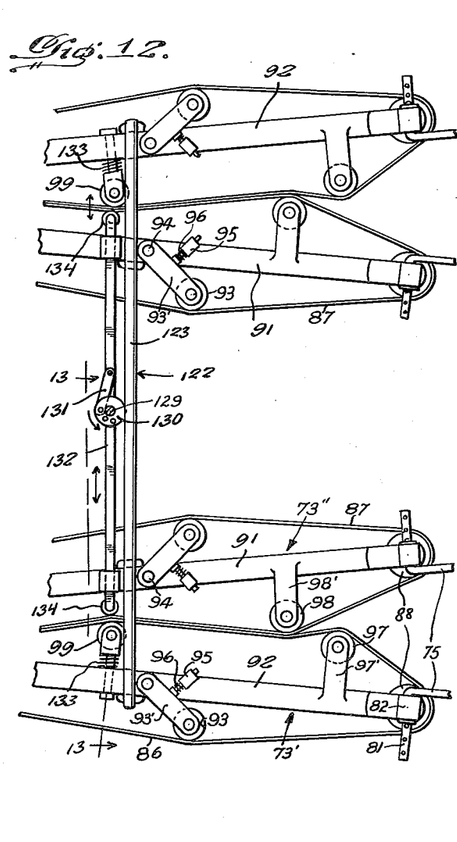
Figure 12 is a detail view showing a modified form of transverse connection between a pair of the vine conveyor units of the machine.
Figure 13:
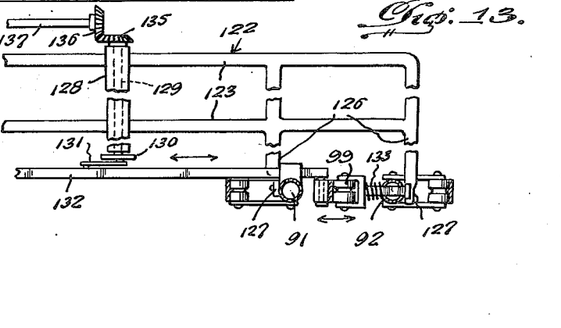
Figure 13 is a fragmentary view, partly in elevation, and partly in section taken on or about the line 13—13 of Figure 12, and illustrating the mounting and operation of the shaker means.

As shown more clearly in Figures 1, 2 and 5, and also in Figures 9 and 13, the pair of conveyor units 73 are cross connected and held in spaced relation to each other by a rigid frame designated generally by the numeral 122. This rigid frame 122, as shown more clearly in Figure 5, is preferably made in two like half sections and comprising a pair of spaced horizontal upper bars 123 whose meeting inner end portions are fitted into retaining sleeves 124 and there detachably secured by transverse pins 125 or other suitable securing means. In some cases, however, this frame 122 may be made in a single integral structure as indicated, for example, in Figures 12 and 13.

It is here noted that the frame 122 may be attached to the respective conveyor units 73 in any desirable manner. As shown, however, the frame is provided at each end portion with a spaced pair of downwardly extending legs 126 which are respectively connected to the beams 91 and 92 of the conveyor units at some point between the middle and forward ends of said beams, as best shown in Figures 5, 9, 12 and 13. The ends of the legs 126 are connected to said beams 91 and 92, as at 127. At this point, it is noted that the hereinbefore mentioned chains 71 are connected at their lower ends to the inner beams 91 of the conveyor unit 73 adjacent where the leg members 126 of the frame 122 are attached to said beams (see Figures 1, 5 and 9). With this construction and arrangement, in the operation of the machine, said conveyor units 73 are supported by said chains 71 as hereinbefore described.

Means for shaking the inner runs of the belts 73' and 73" may be provided, in some cases, so as to cause removal of the dirt from the plants or vines as the same are carried between said inner runs of said belts. A practical example of this is illustrated more clearly in Figures 12 and 13, in which modification, as shown, the rigid connecting frame 122 for the pair of conveyor units 73 is an integral one-piece structure. In this showing, the frame 122 has rigidly attached to the middle thereof an elongated vertical bearing element 128 (see Figure 13). This bearing element 128 is provided with an axial bore in which works a shaft 129, on the lower end of which shaft is provided a disc 130, or, obviously, any other suitable crank element. This crank disc 130 is connected by a pivotally attached link 131 to a transverse agitator rod or bar 132 extending parallel with the frame 122 and in a horizontal plane close to the inner beams 91 of the pair of conveyor units 73. In this modification, the hereinbefore mentioned pulleys 99 on the outer beams 92 instead of being rigidly mounted, as shown in Figure 9, the same are supported to reciprocate transversely movable on the beams 92 and are normally spring urged inwardly, as at 133 (see Figures 12 and 13).

The rod or bar 132 is of a length so that its opposite ends are closely adjacent the pulleys 99, and on the ends of said rod or bar 132 thrust or abutment rollers 134 are journaled in opposed cooperative relation to said pulleys 99, that is to say, the rollers 134 not only are thrust elements but the same afford abutments against which the inner flights of the belts 73' and 73" are pressed by the spring urged pulleys 99 as said belt portions travel between the rollers 134 and pulleys 99. Any suitable provision may be made for rotating the crank shaft 129. As shown, the upper end of the crank shaft 129 is provided with a miter gear 135 which is in mesh with and driven by a similar gear 136 provided on a drive shaft 137. No particular means for operating said drive shaft 137 is shown in the drawings as this particular operating means is not a part, per se, of the present invention. Suffice it to say that the shaft 137 may be driven in any suitable manner by some conventional means, not shown, but which may be obviously a belt or gear connection with, for example, one of the drive chains 107 hereinbefore described for operating the harvesting machine.

From the foregoing, as just above described, rotation of the crank shaft 129 imparts a reciprocatory longitudinal movement to the rod or bar 132, and this, in turn, through the cooperative relation of the pulleys 99 and rollers 134, moves the inner flights of the two belts 73' and 73'' laterally back and forth in quick succession, thereby causing a decided shaking action which loosens the dirt on the roots of the plants or vines passing between these flights of the belts and shakes the loosened dirt from the roots.

As hereinbefore described, the harvested plants or vines, after being dug from the ground by the leading digger members 54 and thence carried through the conveyor units 73, have their root portions turned inwardly. That is to say, the root portions of the plants or vines conveyed by the pair of conveyor elements 73 are turned inwardly toward each other from opposite sides of the longitudinal axis of the machine near the discharge ends of the conveyor units 73, whence the so turned plants or vines are delivered onto a transfer element 138 (see Figures 2, 3 and 4). This transfer element, designated generally by the numeral 138, comprises an inclined body plate 139 attached at its lower end to the upper end of the front wall 40 of the collecting and dumping unit 18, as at 140, from where it extends upwardly for some distance above the top of the unit 18 and has its upper portion turned at an angle rearwardly and downwardly, as at 141, for some distance beyond the discharge ends of the pair of conveyor units 73. That is to say, the lower end of the extension 141 of the plate 139 extends some distance downwardly at an inclination rearwardly, between the side walls 26 of said unit 18, within convenient reach of an operator seated on the rear transverse seat member 42 of the unit. Also, it is preferable to provide buncher fingers 142 with curving and downwardly inclined convergence from the ends of the two beams 91 and 92 of each conveyor unit 73 (see Figures 2 and 4). By the provision of these convergent fingers 142 in conjunction with the downwardly inclined end portion 141 of the transfer element 138, the plants or vines delivered from the conveyor elements or units 73 are bunched or moved close together as they are delivered from said units 73 and it is an easy matter for the operator on the seat 42 to manually arrange or rearrange the plants before the same are dropped into the collecting and dumping unit 18.

As hereinbefore described, it is an easy matter for the operator to pull the cord 53 and thereby release the latch element 47 from the keeper 48, whence, by the overbalancing pivotal mounting of the dumping bottom 43 in the unit 18, the latter is automatically dumped at the will of the operator. So, too, all that the operator has to do to restore the bottom 43 to closed position is to merely press the plate portion of the bottom 43 with his foot and thereby move the same to closed position where it is automatically engaged and held by said latch element 47.

A machine of the character illustrated and herein described is capable of harvesting plants or vines, and more particularly peanut vines of all varieties, in a highly efficient and practical manner, making for commercial economy. It is further noted that the illustration is but one practical exemplification of the invention and the structure, therefore, admits of considerable modification within the purview of the invention as defined by the appended claims. The invention, therefore, is not limited to the specific construction and arrangement shown.

In addition to all of the foregoing description of structure and the advantages thereof, there is one practical advantage of the machine of the present invention in particular. It is in the provision for utilizing at least two parallel conveyors of the character of the units 73 by which the harvested plants or vines are not only freed of dirt while passing therethrough but said plants or vines are turned during their travel to bring the roots of the plants or vines in the one conveyor inwardly towards those in the companion unit and discharging the same in convenient reach of the operator for the handling and bunching, and in which condition the bunched plants or vines may be sheathed or stacked in piles in the field or elsewhere so as to have the root portions protected from the weather by the upper vine portions while drying for later harvesting.

Having thus described the invention, what is claimed is:

1. In a harvesting machine of the character described, a conventional farm tractor or the like, and a harvesting mechanism attached as a trailer to said tractor, said mechanism comprising a leading digger element located under the tractor and supported vertically adjustable thereon, a following upwardly inclined vine clamping conveyor unit, longitudinal plant or vine guiding rails pivotally connecting the forward end of said conveyor to said digger element, a collecting and dumping unit for the harvested plants or vines following said conveyor and supporting the rear end portion thereof, and a longitudinal connection between said collecting and dumping unit and the rear part of the tractor.

2. The combination as set forth in claim 1 wherein the longitudinal connection between the collecting and dumping unit and the tractor permits independent up and down movement of said collecting and dumping unit but prevents independent lateral movement of said collecting and dumping unit, and comprising caster-like ground wheels at opposite sides of said collecting and dumping unit, supporting and carrying means for said caster-like ground wheels connected to and extending rearwardly from said connecting means between the collecting and dumping unit and the tractor, said caster-like ground wheels having outrigger supporting means attached pivotally to the opposited sides of said collecting and dumping unit, and a transverse supporting element having a compensating attachment at its ends to said connecting means between said caster-like ground wheels and said longitudinal connection between the receiving and dumping element and the tractor and said last-mentioned supporting means having a compensating supporting connection intermediate its ends with said collecting and dumping unit.

3. In a harvesting machine of the character described, a tractor, and harvesting means attached to said tractor as a trailer, said harvesting means comprising a pair of digger members located under said tractor and disposed transversely on opposite sides of the longitudinal axis of said tractor, means for raising and lowering said digger members and supporting said members at different digging depths in the ground, a pair of upwardly inclined conveyor units, each conveyor unit being rearwardly spaced from and in substantial longitudinal alignment with one of said digger members, each of said conveyors comprising a pair of endless belts in laterally opposed cooperative relation to each other, the inner flights of said pair of belts of each conveyor unit conveying the dug up plants or vines therebetween, a pair of laterally spaced elongated plant guides operatively connecting each digger and its related conveyor unit for guiding plants to the latter, horizontal pivot means pivotally connecting each pair of guides to its related conveyor unit whereby to support each digger for vertical pivotal movement, a collecting and dumping unit located at the rear of said upwardly inclined conveyor units and supporting the rear end portions of said conveyor units.

4. In a peanut harvesting machine and the like, a leading digger element comprising a dipped substantially arcuate transverse elongated digging blade, means for supporting said blade at the opposite ends thereof with vertical adjustment and for holding the blade at predetermined digging depth in the ground, a trailing conveyor for the dug up plants or vines through which the plants or vines are carried longitudinally and medially therethrough, connecting means between said digger element and the forward end of said conveyor unit, said connecting means comprising a spaced apart longitudinal pair of elongated members, said elongated members of the connecting means constituting a guide for the dug up plants to the conveyor, each of said elongated members comprising two sections, one of said sections being tubular, and the other of said sections being telescopically fitted in said tubular section.

5. In a peanut harvesting machine and the like and including a tractor, leading digger means carried by said tractor with supporting means for vertical adjustment and limiting the digging depth of said digging means, an upwardly inclined vine clamping conveyor for the dug up plants and vines trailing rearward from the tractor, connecting means between the digger means and the forward end of the conveyor for guiding the dug up plants or vines in upstanding position to the conveyor, means on the tractor for adjustably supporting the conveyor unit in connection with and in correlation to said digger means, a receiving and dumping unit trailing the tractor and having a draft connection therewith, said receiving and dumping unit supporting the rear portion of said conveyor, and ground wheels connected to said receiving and dumping unit and to the draft connection between said unit and the tractor, said ground wheels in the said connection thereof to the said draft connection having provision for a compensating support of the receiving and dumping unit by said ground wheels.

6. In a machine of the character described, a spaced apart pair of longitudinal conveyors, each conveyor comprising a cooperative pair of endless belts whose inner flights travel in close relation to each other, and between which the dug up plants or vines are carried, and means for agitating the inner flights of the pair of belts simultaneously and transversely of the conveyors, said means comprising a spring urged pulley abutting said inner flights of the belts from the outside thereof, a transverse rod having rollers at its opposite ends abutting said inner flights of the belts in opposed relation to said outer spring urged pulleys, and means for reciprocating said transverse rod simultaneously with the travel of said inner flights of the conveyor belts.

7. The combination with a conventional farm tractor, of a harvesting machine including harvesting mechanism attached to said tractor as a trailer, said mechanism comprising a leading digger element located under the tractor and supported thereby for vertical adjustment thereon, an upwardly inclined vine clamping conveyor unit carried by said mechanism rearwardly of said digger element, longitudinally extending vine guiding rails pivotally connecting the forward end of said conveyor to said digger element, a collecting and dumping unit for harvested vines carried by said mechanism rearwardly of said conveyor and supporting the rear end portion of the latter, a longitudinal connection between said collecting and dumping unit and the rear part of said tractor, said connection including means preventing lateral movement of said mechanism relative to said tractor, said last-named means including means pivotally connecting said mechanism to said tractor for independent up and down movement relative thereto.

8. In a harvesting machine of the character described, a tractor, and harvesting means attached to said tractor as a trailer, said harvesting means comprising a pair of digger members located under said tractor and disposed transversely on opposite sides of the longitudinal axis of said tractor, means for raising and lowering said digger members and supporting said members at different digging depths in the ground, a pair of upwardly inclined conveyor units, one of each unit being rearward and in substantial longitudinal alignment with one of said digger members, each of said conveyors comprising a pair of endless belts in laterally opposed cooperative relation to each other, the inner flights of said pair of belts of each conveyor unit conveying the dug up plants or vines therebetween, elongated laterally spaced apart connecting members between each digger member and its correlated conveyor unit for guiding to the respective conveyor units the plants or vines dug up by the digger members, a collecting and dumping unit located at the rear of said upwardly inclined conveyor units and supporting the rear end portions of said conveyor units, wherein means mounting said pair of belts in each conveyor unit are in cooperative relation to each other in a substantially horizontal plane at the forward ends of said units, and in a substantially vertical plane at the rear ends of said units whereby said belts are laterally twisted from the forward to the rear ends of said conveyor units laterally so that the plants dug up by the digger members and conveyed through the said conveyor units are taken first substantially vertically into each conveyor unit and gradually turned during travel through said units so that the root portions of the plants or vines as discharged from the pair of conveyor units are turned inwardly toward each other.

9. In a peanut harvesting machine and the like, a leading digger element comprising a dipped substantially arcuate transverse elongated digging blade, means for supporting said blade at the opposite ends thereof with vertical adjustment and for holding the blade at predetermined digging depth in the ground, a trailing conveyor for the dug up plants or vines through which the plants or vines are carried longitudinally and medially therethrough, connecting means between said digger element and the forward end of said conveyor unit, said connecting means comprising a spaced apart longitudinal pair of elongated members, said elongated members of the connecting means constituting a guide for the dug up plants to the conveyor, said elongated members including front and rear ends, means universally pivotally connecting said forward ends to said digger element, means universally connecting said rear ends with said conveyor, and means for adjusting said rear ends laterally toward and away from each other relative to said forward ends and to said conveyor.

CHARLIE M. BROWN.
FLOYD HORNE.

REFERENCES CITED

The following references are of record in the file of this patent:

UNITED STATES PATENTS

| Number | Name | Date |
| --- | --- | --- |
| 252,687 | Meierdircks | Jan. 24, 1882 |
| 630,167 | Bean | Aug. 1, 1899 |
| 1,277,120 | Rainer | Aug. 27, 1918 |
| 1,592,962 | Sample | July 20, 1926 |
| 1,837,077 | Siepp | Dec. 15, 1931 |
| 1,848,394 | Steere | Mar. 8, 1932 |
| 2,297,065 | McLendon | Sept. 29, 1942 |
| 2,316,501 | Braxton | Apr. 13, 1943 |

FOREIGN PATENTS

| Number | Country | Date |
| --- | --- | --- |
| 118,073 | Australia | Feb. 10, 1944 |